United States Patent [19]

Heuscher

[11] Patent Number: 5,481,583
[45] Date of Patent: Jan. 2, 1996

[54] HIGHER ORDER PREINTERPOLATOR FOR BACKPROJECTION

[75] Inventor: Dominic J. Heuscher, Aurora, Ohio

[73] Assignee: Picker International, Inc., Highland Hts., Ohio

[21] Appl. No.: 295,990

[22] Filed: Aug. 24, 1994

[51] Int. Cl.$^6$ ............................ A61B 6/03; G01N 23/083; G06F 7/38
[52] U.S. Cl. ................................ 378/4; 378/901; 364/723
[58] Field of Search ......................... 378/4, 901; 364/723

[56] References Cited

U.S. PATENT DOCUMENTS

| | | | |
|---|---|---|---|
| 4,149,248 | 4/1979 | Pavkovich. | |
| 4,562,540 | 12/1985 | Devaney | 364/400 |
| 5,018,090 | 5/1991 | Shiratsuchi | 364/723 |
| 5,148,499 | 9/1992 | Matsumura | 382/54 |

OTHER PUBLICATIONS

"Comparison of Interpolating Methods for Image Resampling", Parker, et al., IEEE Trans. on Med. Imaging, vol. MI–2, No. 1, Mar. 1983, pp. 31–39.
"A New Approach to Interpolation in Computed Tomography", Brooks, et al., Journ. Comput. Asst. Tomogr., vol. 2, No. 5, Nov. 1978, pp. 577–585.
"Image Reconstruction by Parametric Cubic Convolution", Park, et al., Computer Vision, Graphics & Image Processing, 23, 1983, pp. 258–272.
Presentation of Dominic J. Heuscher at International Symposium & Course on Computed Tomography, Apr. 1980.

*Primary Examiner*—David P. Porta
*Assistant Examiner*—David Vernon Bruce
*Attorney, Agent, or Firm*—Fay, Sharpe, Beall, Fagan, Minnich & McKee

[57] ABSTRACT

X-ray detectors (24) of a CT scanner (10) generate data values which are preprocessed and assembled (26) into binary data lines. The binary data lines are convolved by a convolver (30) which convolves a plurality of data lines concurrently. A backprojector (32) includes a parametric cubic spline preinterpolator (40) which performs a high order interpolation on the convolved data lines and a linear interpolator (42) which performs a linear interpolation on the high order preinterpolated data lines. The interpolated data lines are backprojected into an image memory (34). Data from the image memory (34) is converted (36) to appropriate format for display on a video monitor (38). The parametric cubic spline preinterpolator (40) includes a first adder (52) which adds most adjacent data lines and a second adder (54) which adds next most adjacent data lines. A first barrel shifter (58) shifts the binary sum of the most adjacent data lines by 1–N spaces, where N is an integer, 4 in the preferred embodiment. The shifting is done in a direction which effectively multiplies the data by $2^{N-1}$. The difference between the sum of the adjacent and next most adjacent data lines is determined (56) and the difference is added (60) to the output of the first barrel shifter. A second barrel shifter (62) shifts the output of the third adder by N bits in the opposite direction, effectively dividing by $2^N$ to create a higher order interpolated data line between each received convolved data line.

15 Claims, 2 Drawing Sheets

HIGHER ORDER PREINTERPOLATOR FOR BACKPROJECTION

BACKGROUND OF THE INVENTION

The present invention relates to the image reconstruction arts. It finds particular application in conjunction with convolution/backprojection reconstruction of CT image data and will be described with particular reference thereto. It is to be appreciated, however, that the invention will also find application in conjunction with other reconstruction processes in which data is backprojected or subject to processing techniques analogous to backprojecting, such as SPECT imaging.

Heretofore, CT image data from the detectors has been convolved, often several lines in parallel for faster processing. The convolved data is backprojected into an image memory to create an image representation. In order to improve resolution, the convolved data has been subject to linear interpolation prior to backprojection. In a typical linear interpolation, adjacent data lines are averaged. However, linear interpolation tends to create Moire artifacts.

The Moire artifacts can be reduced or eliminated by using higher order interpolations. That is, rather than a simple linear averaging of nearest neighbor data lines, a more complicated averaging of several neighboring as well as the nearest neighboring data lines. The problem with higher order interpolations is that they have heretofore required additional memories to accommodate the larger plurality of neighboring data lines combined in the higher order interpolation.

The present invention contemplates a new and improved higher order interpolation which overcomes the above-referenced problems and others.

Summary of the invention

In accordance with the present invention, a backprojector is provided with a preinterpolator that interpolates convolved data lines prior to backprojection.

In accordance with one aspect of the present invention, the preinterpolator is incorporated into the backprojector and it performs a higher order interpolation.

In accordance with another aspect of the present invention, the preinterpolator includes adders and barrel shifters, but no memory.

In accordance with another aspect of the present invention, the preinterpolator forms a cubic spline interpolation.

In accordance with another aspect of the present invention, the cubic spline interpolation is a parametric cubic spline for mid-point interpolation that has a cubic parameter $\alpha = -2(^{3-N})$, where $2<N<6$.

In accordance with another aspect of the present invention, the higher order interpolation is followed by a linear interpolation.

One advantage of the present invention is that it eliminates image artifacts associated with critically sampled data.

Another advantage of the present invention is that it is easily implemented in hardware.

Another advantage of the present invention is that it avoids high data transfers.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
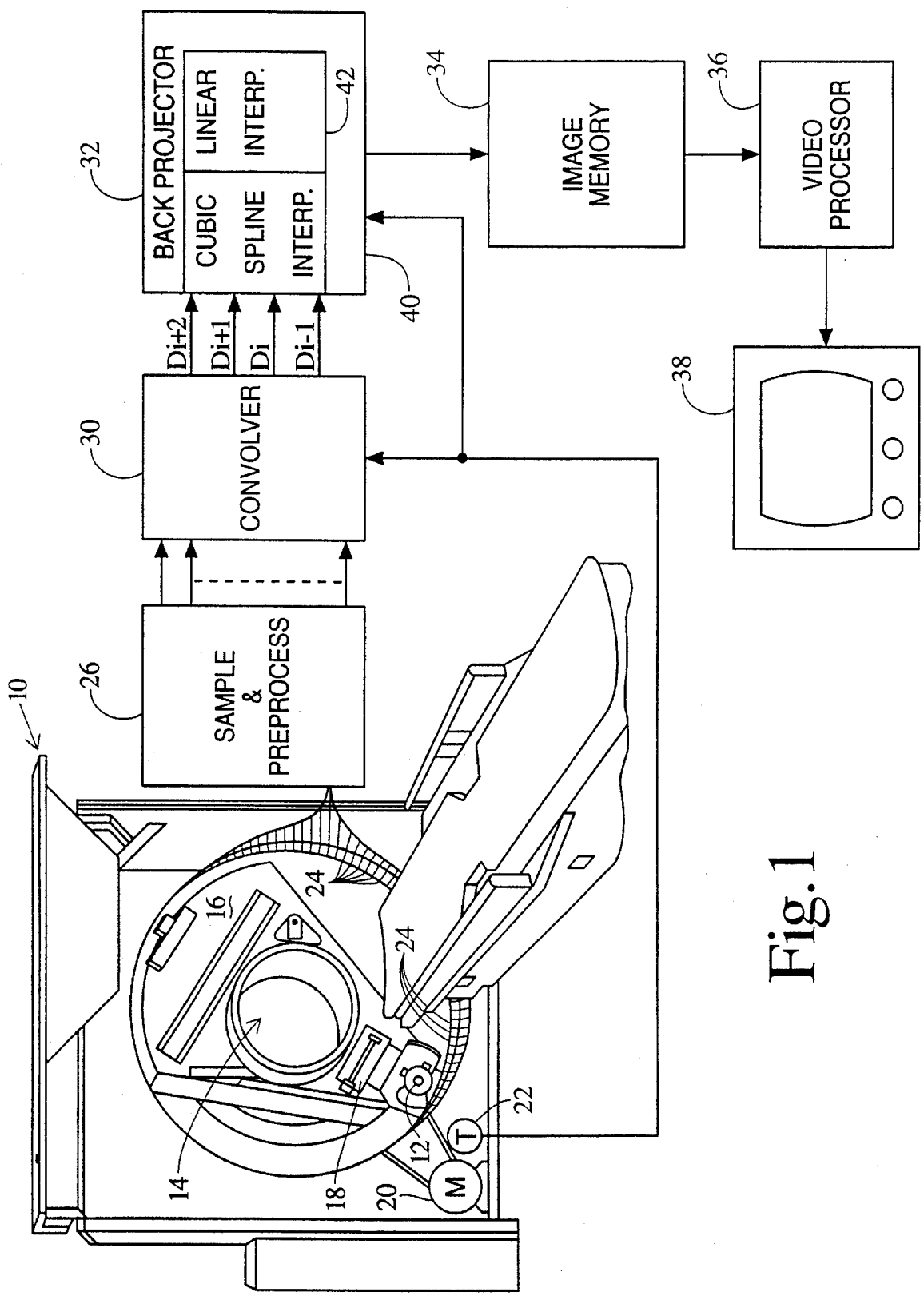
FIG. 1 is a diagrammatic illustration of a CT scanner in accordance with the present invention.

With reference to FIG. 1, a CT scanner 10 includes a radiation source 12, such as an x-ray tube, for projecting a fan beam of radiation through an examination region or scan circle 14. The x-ray tube is mounted on a rotatable gantry 16 to rotate the fan beam of radiation around the examination region. A collimator and shutter 18 collimates the beam of radiation to one or more narrow, planar beams and selectively gates the beam on and off. A motor 20 provides motive power for rotating the gantry 16, preferably continuously, around the examination region. A rotational position encoder or tachometer 22 is connected with the motor and gantry to measure the rotational position of the gantry, hence the apex of the fan beam of radiation.

In the illustrated fourth generation CT scanner, a ring of radiation detectors 24, preferably about 4,000 detectors, are mounted peripherally around the examination region. For mechanical and mathematical convenience, the detectors 24 are stationarily mounted around the rotating gantry in the same plane as the x-ray tube. Alternately, an arc of detectors can be mounted to the rotating gantry 16 across the examination region from the x-ray source, i.e., a third generation scanner.

Each of the radiation detectors produces an output signal which is proportional to an intensity of received radiation. Optionally, a reference detector may detect radiation which has not traversed the subject in the examination region. A difference between the magnitude of radiation received by the reference detector and each detector of the ring provides an indication of the amount of radiation attenuation along a corresponding ray of a sampled fan of radiation.

A sampling and preprocessing circuit 26 is connected with the radiation detectors and the angular position encoder to provide a series of fan beam data lines or views corresponding to each angular position around the examination region 14. In the illustrated fourth generation scanner embodiment, each view or data line represents a fan of rays having its apex at one of the detectors collected over a short period of time as the radiation source rotates behind the examination region from the detector. In a third generation scanner, each view or data line represents a fan of rays having an apex at the x-ray tube collected by concurrent sampling of all detectors. The intensity value for each ray of each data line is digitized at the detectors 24 or at the sampling and preprocessing circuit 26. Various interpolation, filtering, and other data processing operations as are conventional in the art are also performed.

As each line of digital data is completed, it is conveyed to a convolver 30 which convolves the data of each data line with a convolution or filter function. It will be noted that in the fourth generation scanner embodiment, as the radiation source moves, each irradiated detector is concurrently generating intensity data. In order to accommodate this rapid flow of information, the convolver preferably includes a plurality of convolvers for convolving several data lines concurrently.

The convolved data lines are conveyed to a backprojector 32 which backprojects each convolved data line into an image memory 34 to reconstruct an electronic image representation. A video processor 36 retrieves selected portions of the data in the video memory 34 and converts them to appropriate format for display on a video monitor 38. Reconstructed electronic images are also sent to a central storage system for subsequent recall and viewing. Hard copy printers (not shown) convert the electronic images to human-readable paper images.

The backprojector includes a high order preinterpolator 40 which performs a high order preinterpolation on the data lines to increase the number of data lines which are backprojected by the backprojector. A linear interpolator 42 performs a linear interpolation on the high order interpolated data lines from the preinterpolator 40 to increase the number of data lines again.

Figure 2:
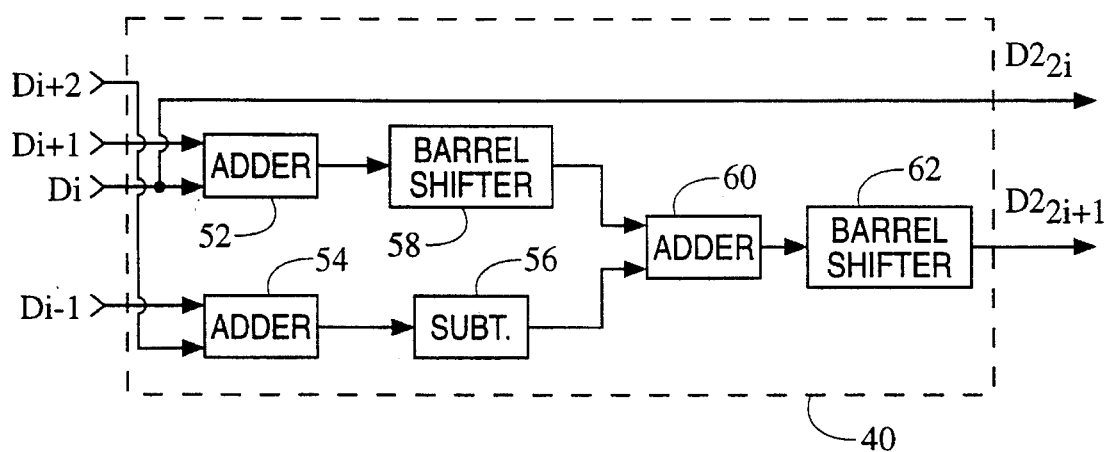
FIG. 2 is a detailed illustration of the high order preinterpolator of FIG. 1; and, FIG. 3 is a detailed illustration of a preferred embodiment of the linear interpolator of FIG. 1.

With reference to FIG. 2, the high order interpolator 40 performs a mid-point interpolation with a cubic spline function to increase the number of data lines by a factor of 2. A parametric cubic spline function f(x) is defined as:

$$f(x) = \begin{cases} (\alpha+2)|x|^3 - (\alpha+3)|x|^2 + 1 & \text{for } |x| < 1 \\ \alpha|x|^3 - 5*\alpha|x|^2 + 8*\alpha|x| - 4*\alpha & \text{for } 1 \leq |x| < 2. \\ 0 & \text{otherwise} \end{cases} \quad (1)$$

With this interpolation scheme, the parametric cubic spline $\alpha$ value assumes the value of $\alpha=-2$ for N=2; $\alpha=-1$ for N=3; $\alpha=-0.5$ for N=4; or, in general $\alpha=-2^{(3-N)}$.

The output of the high order preinterpolator of FIG. 2 includes two data lines $D2_{2i}$ and $D2_{2i+1}$ for each incoming data line $D_i$. More specifically:

$$D2_{2i}=D_i$$

$$D2_{2i+1}=[(2^{N-1}+1)*(D_i+D_{i+1})-(D_{i-1}+D_{i+2})]/2^N \quad (2).$$

As N becomes very large, the interpolation approaches a linear interpolation. As N becomes very small, the curve becomes steep with overshoot at the edges providing, in many instances, too much edge enhancement. In the preferred embodiment N is between 2 and 6 with 4 preferred.

In the preferred embodiment, the convolver 30 has four parallel convolving channels which produce output convolved data lines D. More specifically, a current data line $D_i$, a preceding data line $D_{i-1}$, a subsequent data line $D_{i+1}$, and a further data line $D_{i+2}$. The high order preinterpolator 40 interpolates each data line $D_i$ into a pair of data lines $D2_{2i}$ and $D2_{2i+1}$. The convolved data lines then each index by 1 and the preinterpolation process is repeated.

More specifically, the data line $D_i$ is connected to a first output terminal 50 to become interpolated data $D2_{2i}$. An adder 52 adds the adjacent data lines $D_i$ and $D_{i+1}$. A second adder 54 adds the two next most adjacent data lines $D_{i-1}$ and $D_{i+2}$. A subtracter 56 subtracts the two sums to provide a difference which represents twice the difference between the average of the two closest and the two next most closest data lines. A barrel shifter 58 shifts the data values of the sum from adder 52 by 1-N. Because the data is in binary, shifting the data in a negative sense is effectively multiplying the data by a corresponding power of 2. That is, for N=4, shifting by -3 effectively multiplies the sum by 8 ($2^3$). Another adder 60 adds the output of the first barrel shifter 58 and the subtracter 56. A second barrel shifter 62 shifts the sum from the adder 60 in the opposite direction by N, which effectively divides the data. Where N=4, the shifter 62 effectively divides by 16 ($2^4$). In this manner, the second barrel shifter 62 scales the data back to a magnitude commensurate with the initial data line adjusted in accordance with the deviation between the two closest data lines and the two next most adjacent data lines. After the pair of high order interpolated data lines $D2_{2i}$ and $D2_{2i+1}$ have been generated, the input data lines are shifted and a new pair of interpolated data values are generated.

Figure 3:
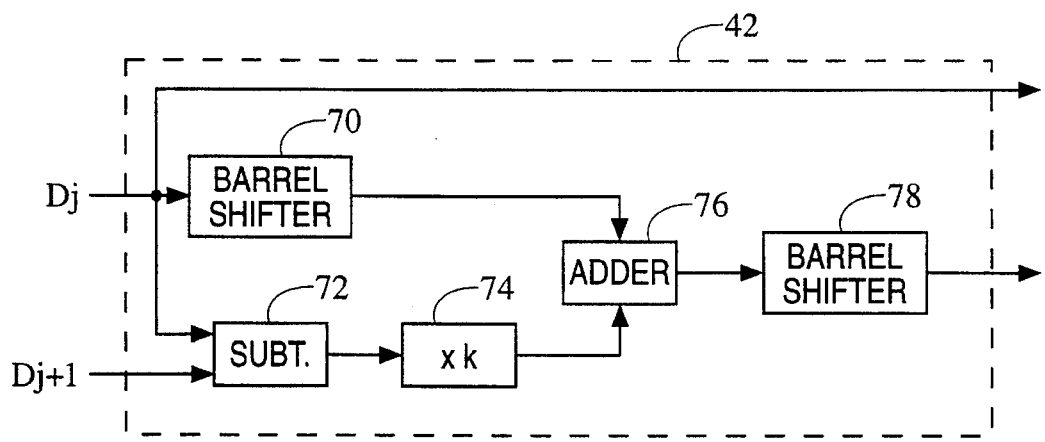

With reference to FIG. 3, each data line from the high order preinterpolator $D2_j$ is linearly interpolated by a linear interpolation by a factor of $2^M$:

$$\text{Interpolated Data}=[(2^M*D2_j+k*(D2_{j+1}-D2_j)]/2^M \quad (3)$$

for k=0, ..., M-1.

More specifically, a barrel shifter 70 shifts each data line by $-M$ bits to multiply it by $2^M$. A subtracter 72 subtracts each data line and its adjacent data line. The difference from the subtracter is multiplied by k to generate a weighted difference. An adder 76 adds the weighted difference to the product from barrel shifter 70. A second barrel shifter 78 shifts each data line by M bits to divide the sum by $2^M$, producing a linearly interpolated data line. For each input data line, the multiplication factor k is indexed from k=0 through k=M-1 to produce M linearly interpolated data lines.

Alternately, cubic or other higher order interpolations can be performed with a coefficient table look-up, to interpolate the data by a factor of $2^M$. This look-up table approach provides more than sufficient accuracy, but adds some complexity to the hardware design.

As another alternative, the above-described interpolation scheme can be incorporated into the convolver, either in or out of the Fourier transform.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. In a CT scanner which includes a radiation source which generates a beam of radiation, a multiplicity of radiation detectors which receive radiation from the source that has traversed an examination region and converts the received radiation into electronic data, a convolver which convolves lines of the electronic data from the detectors, and a backprojector which backprojects convolved lines of data into an image memory, the improvement comprising:

a high order preinterpolator incorporated in the backprojector.

2. In the CT scanner of claim 1, the improvement further including the high order preinterpolator to perform a parametric cubic spline interpolation.

3. In the CT scanner of claim 2, the high order preinterpolator further including:

a first adder which adds a convolved data line with an adjacent convolved data line;

a second adder which adds a pair of next most adjacent data lines;

a subtracter which subtracts sums from the first and second adders;

a first barrel shifter which shifts the sum from the first adder by 1-N spaces, where N is an integer;

a third adder which adds an output of the barrel shifter and an output of the subtracter; and, a second barrel shifter which shifts the output of the third adder by N to produce high order interpolated data lines.

4. In the CT scanner as set forth in claim 3, the improvement further including N=4.

5. In the CT scanner as set forth in claim 1, the improvement further including a linear interpolator which linearly interpolates high order interpolated data lines from the high order preinterpolator.

6. A CT scanner comprising:

an x-ray source;

a multiplicity of detectors positioned to detect radiation from the x-ray source which has traversed a portion of a subject in an examination region;

a convolver connected with the detectors;

a preinterpolator which performs a parametric cubic spline interpolation, the preinterpolator being connected with the convolver;

a backprojector connected with the preinterpolator; and, an image memory connected with the backprojector to receive and store reconstructed images.

7. The CT scanner as set forth in claim 6 wherein the parametric cubic spline preinterpolator includes:

a first adder which adds each convolved data line from the convolver with an adjacent convolved data line;

a second adder which adds a pair of next most adjacent convolved data lines from the convolver;

a subtracter which subtracts sums from the first and second adders;

a barrel shifter which shifts the sum from the first adder by 1–N spaces, where N is an integer;

a third adder which adds an output of the barrel shifter with an output of the subtracter; and, a second barrel shifter for shifting the output of the third adder by N.

8. The CT scanner as set forth in claim 6 further including a linear interpolator which linearly interpolates data lines from the parametric cubic spline preinterpolator.

9. The CT scanner as set forth in claim 8 wherein the parametric cubic spline and linear interpolators are incorporated into the backprojector.

10. A parametric cubic spline preinterpolator comprising:

a first adder which adds each received data line with an adjacent data line;

a second adder which adds a pair of next most adjacent data lines;

a subtracter which subtracts sums from the first and second adders;

a barrel shifter which shifts the sum from the first adder by 1–N spaces, where N is an integer;

a third adder which adds an output of the barrel shifter with an output of the subtracter; and, a second barrel shifter for shifting the output of the third adder by N.

11. A method of reconstructing image data, the method comprising:

convolving each of a multiplicity of data lines;

performing a parametric cubic spline interpolation of at least adjacent and next most adjacent data lines; and, backprojecting the parametric cubic spline interpolated data lines into an image representation.

12. The method as set forth in claim 11 further including between the parametric cubic spline interpolation and backprojecting steps, linearly interpolating the parametric cubic spline interpolated data lines.

13. The method as set forth in claim 11 wherein the parametric cubic spline interpolation includes:

summing the adjacent data lines to produce a binary sum of the adjacent data lines;

summing the next most adjacent data lines to produce a binary sum of the next most adjacent data lines;

subtracting the binary sums of the adjacent and next most adjacent data lines to generate a difference;

shifting the binary adjacent data line sum by 1–N, where N is a positive integer, such that the magnitudes of the data line are effectively multiplied by $2^{N-1}$;

summing the difference and the shifted adjacent data line sum to create a second binary sum; and, shifting the second binary data line sum by N such that the second sum is effectively divided by $2^N$ to create an interpolated data line in addition to each input data line for backprojection into the image representation.

14. The method as set forth in claim 13 further including converting the backprojected image representation into a human-readable display.

15. The method as set forth in claim 13 further including before the convolving step:

generating a fan beam of radiation;

passing the fan beam of radiation through a portion of a subject in the examination region;

rotating the fan beam of radiation around the examination region;

at a multiplicity of points around the examination region, sensing radiation which has traversed the subject and the sensed radiation into binary data values; and, assembling the binary data values into data lines for the convolving step.

* * * * *